(12) United States Patent
Michau et al.

(10) Patent No.: US 6,581,902 B2
(45) Date of Patent: Jun. 24, 2003

(54) SELF-CLEANING METERING DEVICE

(75) Inventors: Marion Michau, Vincennes (FR); José Rodrigues, Nandy (FR); Alain Tiepel, Chailly en Biere (FR)

(73) Assignee: SNECMA Moteurs, Paris (FR)

( * ) Notice: Subject to any disclaimer, the term of this patent is extended or adjusted under 35 U.S.C. 154(b) by 0 days.

(21) Appl. No.: 09/953,144

(22) Filed: Sep. 17, 2001

(65) Prior Publication Data

US 2002/0033463 A1 Mar. 21, 2002

(30) Foreign Application Priority Data

Sep. 18, 2000 (FR) .............................. 00 11858

(51) Int. Cl.⁷ ............................................. F16K 47/00
(52) U.S. Cl. .......................................... 251/126; 138/42
(58) Field of Search ...................... 251/126; 138/40–46

(56) References Cited

U.S. PATENT DOCUMENTS

| | | | | |
|---|---|---|---|---|
| 2,105,314 A | * | 1/1938 | Duncan | 251/126 |
| 3,018,041 A | * | 1/1962 | Bidwell | 251/126 |
| 3,247,967 A | * | 4/1966 | Kucmerosky | 251/126 |
| 4,176,683 A | | 12/1979 | Leibinsohn | |
| 4,177,947 A | * | 12/1979 | Menzel | 251/126 |
| 4,350,009 A | | 9/1982 | Holzapfel | |
| 4,653,695 A | * | 3/1987 | Eckstein | 251/126 |
| 2002/0027212 A1 | * | 3/2002 | Johnson | 251/126 |

FOREIGN PATENT DOCUMENTS

| | | | | |
|---|---|---|---|---|
| BE | 378 084 | | 3/1931 | |
| DE | 732467 | * | 3/1943 | 251/126 |
| DE | 255 577 | | 4/1988 | |
| SU | 445031 | * | 5/1975 | 251/126 |

OTHER PUBLICATIONS

U.S. patent application Ser. No. 02/027,212, Johnson, filed Mar. 2002.*

* cited by examiner

*Primary Examiner*—Paul J. Hirsch
(74) *Attorney, Agent, or Firm*—Oblon, Spivak, McClelland, Maier & Neustadt, P.C.

(57) ABSTRACT

In a fluid metering device for metering a fluid from a supply source to means of use of this fluid comprising a metering valve able to slide in a sleeve over a travel C, this valve comprising an intake orifice (16) for admitting the fluid from the said supply source and an orifice (18) for ejecting this fluid to the means of use, there are provided means (20) for channelling the fluid intended to allow, during the movement of the metering valve in its sleeve, a sweeping of the fluid over all the contacting surfaces of the valve and of the sleeve. The means of channelling the fluid advantageously comprise a helical groove of width L and of pitch P.

6 Claims, 1 Drawing Sheet

SELF-CLEANING METERING DEVICE

FIELD OF THE INVENTION

The present invention relates to the general field of devices for controlling fluid flowrate and it is more particularly concerned with a self-cleaning metering device.

PRIOR ART

It is known that in valves used for regulation, the operational guidance lengths give rise to friction which then generates a hysteresis phenomenon. This friction is all the greater since the contamination which exists in any fluid causes the creation of "gums" on the contacting guiding surfaces.

In the particular case of the metering devices of fuel injection systems, in turbojets or turboprops (more generally referred to as turbomachines), this hysteresis causes a heterogeneity of the injection flowrate which could impair the proper operation of the turbomachine, especially at the time of switch-on thereof.

A solution to this problem conventionally consists in reducing the frictional surface areas. However, this solution has the major drawback of increasing the contact wear of the remaining operational surfaces and therefore of limiting the lifetime of the metering device. Another solution consists in reducing the coefficient of friction of the contacting surfaces. However, here again, this solution proves to be inadequate when the build-up of gums or/and of contaminants becomes too large.

OBJECT AND DEFINITION OF THE INVENTION

It is therefore an object of the present invention to alleviate these drawbacks by proposing a fluid metering device which makes it possible to appreciably reduce or even to eliminate any build-up of contaminants due to the movement of the fluid through the device.

These aims are achieved by a fluid metering device for metering a fluid from a supply source to means of use of this fluid comprising a metering valve able to slide in a sleeve over a travel C, the said valve comprising an intake orifice for admitting the fluid from the said supply source and an orifice for ejecting this fluid to the said means of use, characterized in that it comprises means of channelling the fluid intended to allow, during the movement of the metering valve in its sleeve, a sweeping of the fluid over all the contacting surfaces of the said valve and of the said sleeve.

With this particular structure, the fluid is compelled to sweep all the contacting surfaces. Self-cleaning of the device is thus ensured, thereby preventing the build-up of contaminants, and the creation of "gums", by discharging them with the metered fluid.

Advantageously, the means of channelling the fluid comprise a helical groove of width L and of pitch P.

According to the embodiment envisaged, the means of channelling the fluid may be disposed on the said metering valve or on the said sleeve.

Preferably, the travel C of the metering valve is greater than or equal to the distance P–L.

BRIEF DESCRIPTION OF THE DRAWINGS

The characteristics and advantages of the present invention will become more apparent from the following description, given by way of non-limiting indication, in conjunction with the appended drawings in which.

DETAILED DESCRIPTION OF A PREFERRED EMBODIMENT

Figure 1:
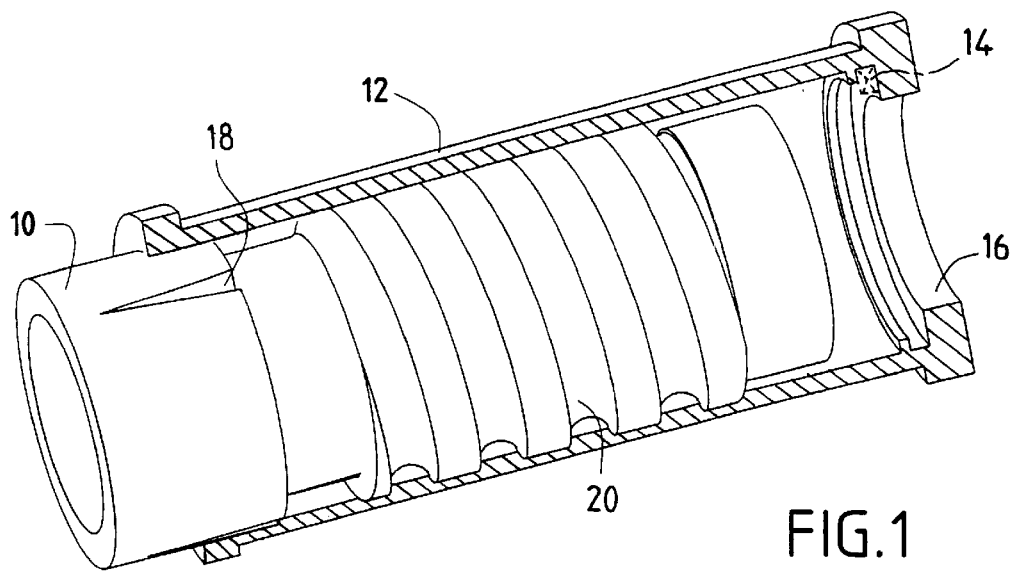
FIG. 1 is a perspective view illustrating a metering device according to the invention.

FIG. 1 illustrates in perspective a metering device in accordance with the invention, intended for supplying means of use (not represented) with a pressurized fluid fed from a supply source (not represented). An exemplary application of such a metering device is given with a system for injecting fuel into a combustion chamber of a turbomachine.

Figure 2:
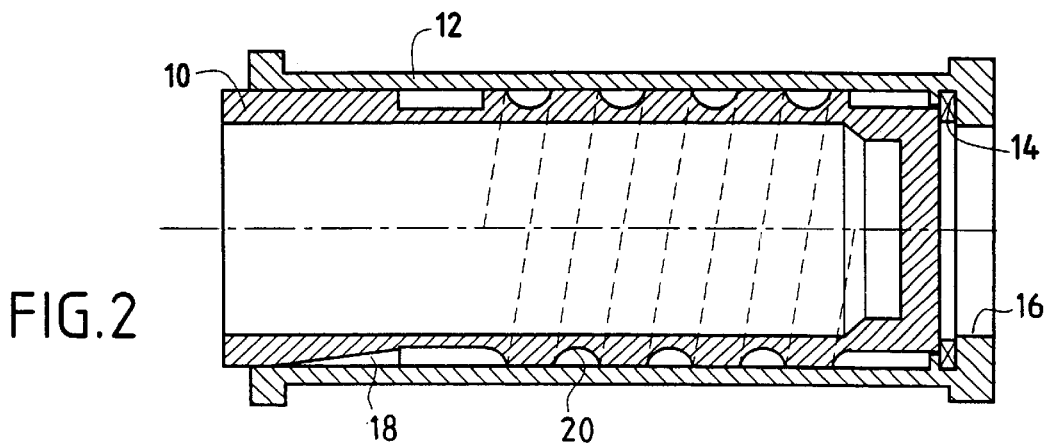
FIGS. 2 and 3 are two sectional views of the metering device of FIG. 1 in two positions characteristic of its mode of operation.
Figure 3:
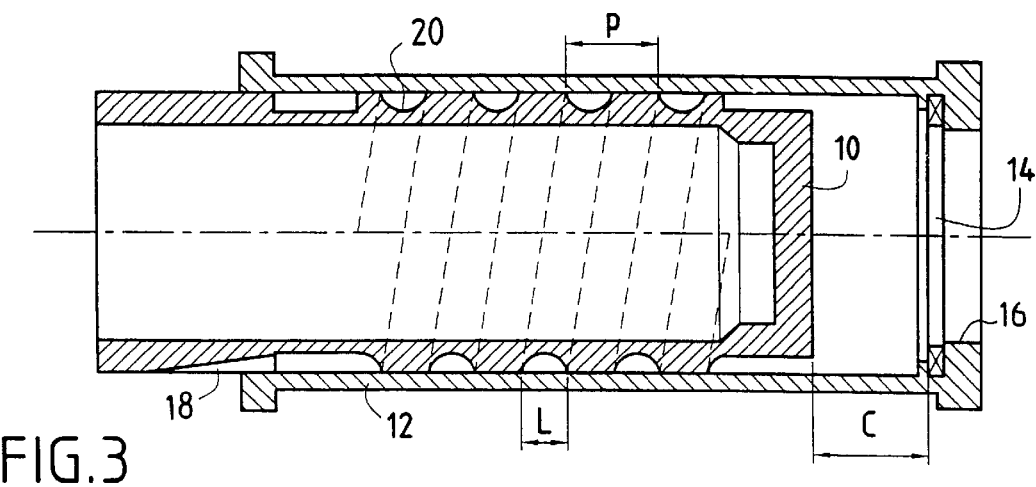

Under the action of the fluid subjected to a specified supply pressure, a metering valve 10 can slide in a cylindrical sleeve 12 between an initial closure position in which the valve blocks the fluid and comes into contact against a seal 14 disposed level with a fluid intake orifice 16 (see FIG. 2), and a terminal opening position in which the fluid can pass through the metering device and flow towards the means of use of this fluid through an ejection orifice 18 in the form of slots made in the metering valve and whose flow cross sections are dimensioned so as to ensure the desired metered dose at the level of these means of use (see FIG. 3).

According to the invention, the metering valve comprises means 20 for channelling the fluid intended to allow, during the movement of the metering valve in its sleeve, over its entire travel C, a sweeping of this fluid over all the contacting surfaces of the valve and of the sleeve. These channelling means are, preferably, constituted by a helical groove of width L whose pitch P is specified in such a way that, during each valve opening/closing cycle, the fluid sweeps all the contacting surfaces and thus removes the contaminants which may have built up there.

Thus, if one considers the travel C of the valve and the pitch P of the groove whose width L is, in the example illustrated, equal to P/2, this condition will be realized if C is greater than or equal to P/2. More generally (for cases where the ratio of the pitch of the groove to its width is not equal to ½), this condition will be satisfied if the travel C of the valve is greater than or equal to the distance P–L (difference between the pitch P and the width L).

Of course, the magnitude of the depth of the groove will be calculated to accommodate the desired fluid flowrate and avoid overly large head losses in the means of use.

It will be noted that whereas, in the example illustrated, the groove 20 is made in the valve 10, it is quite obvious that it is also entirely conceivable to form it in the sleeve 12. In one or other of these two alternative configurations, the groove, by also ensuring a scraping of the contacting surfaces, makes it possible to detach the contaminants built up on them. Furthermore, the sweeping effected by the fluid at the level of these channelling means constituted by the helical groove 20 allows discharge of these contaminants to the means of use of the fluid and thus achieves self-cleaning of the metering valve.

What is claimed is:

1. Fluid metering device for metering a fluid from a supply source to a user device, the fluid metering device comprising:
   a sleeve;
   a metering valve configured to slide in the sleeve over a length of travel, the valve comprising an intake orifice configured to admit the fluid from the supply source, and an ejection orifice configured to meter the fluid and eject the metered fluid to the user device, the ejection orifice including an ejection slot positionable outside of the sleeve; and
   a channelling device configured to permit a sweeping of the fluid over all surfaces of the sleeve that contact the valve during the sliding of the valve in the sleeve.

2. Fluid metering device according to claim 1, wherein the channelling device comprises a helical groove having a width and a pitch.

3. Fluid metering device according to claim 1, wherein the channelling device is disposed on the metering valve.

4. Fluid metering device according to claim 1, wherein the channelling device is disposed on the sleeve.

5. Fluid metering device according to claim 2, wherein the length of travel of the metering valve is greater than or equal to a distance defined as the pitch minus the width.

6. Fuel injector for a turbomachine combustion chamber comprising a fuel metering device according to any one of claims 1 to 5.

* * * * *